(12) United States Patent
Bailey et al.

(10) Patent No.: US 11,061,716 B2
(45) Date of Patent: Jul. 13, 2021

(54) ATTRIBUTE-BASED ACCESS CONTROL USING A DYNAMIC EXPRESSION ENGINE

(71) Applicant: SALESFORCE.COM, INC., San Francisco, CA (US)

(72) Inventors: Nicholas Bailey, Chicago, IL (US); Jon Stahl, Seattle, WA (US); David Manelski, Seattle, WA (US); Michael McCormick, Boulder, CO (US); Nicholaus Lacock, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 30 days.

(21) Appl. No.: 16/227,587

(22) Filed: Dec. 20, 2018

(65) Prior Publication Data

US 2020/0057671 A1    Feb. 20, 2020

Related U.S. Application Data

(60) Provisional application No. 62/720,072, filed on Aug. 20, 2018.

(51) Int. Cl.
| | |
|---|---|
| *G06F 9/46* | (2006.01) |
| *G06F 21/62* | (2013.01) |
| *G06F 12/0815* | (2016.01) |
| *G06F 9/50* | (2006.01) |
| *G06F 9/54* | (2006.01) |
| *G06Q 30/02* | (2012.01) |

(52) U.S. Cl.
CPC .............. *G06F 9/468* (2013.01); *G06F 9/505* (2013.01); *G06F 9/5072* (2013.01); *G06F 9/541* (2013.01); *G06F 12/0815* (2013.01); *G06F 21/6218* (2013.01); *G06Q 30/0279* (2013.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman et al. | |
| 9,612,878 B2 * | 4/2017 | Di Balsamo | .......... G06F 9/5083 |
| 10,154,007 B1 * | 12/2018 | Viswanathan | ........ H04L 63/101 |

OTHER PUBLICATIONS

Ngo et al., "Multi-tenant attribute-based access control for cloud infrastructure services", Journal of Information Security and Applications, vol. 27-28, Apr.-May 2016, pp. 65-84 (Year: 2016).*

(Continued)

*Primary Examiner* — Eric C Wai
(74) *Attorney, Agent, or Firm* — NDWE, LLP

(57) ABSTRACT

A computer implemented method manages access to resources of a philanthropy cloud platform. The method includes retrieving, at a computing device of the philanthropy cloud platform, context data and load policies for a requestor and an identified resource, combining, by the computing device, loaded policies with context data into a combined data structure, evaluating, by the computing device, a resource request and apply policies for requestor based on role of requestor using the combined data structure, generating, by the computing device, resource permissions for the requestor, and returning, by the computing device, resource permissions to the requestor.

18 Claims, 10 Drawing Sheets

(56) References Cited

OTHER PUBLICATIONS

Bailey, N., "Announcing Salesforce.org Philanthropy Cloud: a New Corporate Philanthropy Network for Employee Engagement," Salesforce.org, Feb. 27, 2018, downloaded from www.salesforce.org/announcing-salesforce-org-philanthropy-cloud-a-new-corporate-philanthropy- . . . on Jul. 24, 2018, 7 pages.
Benevity, "A Corporate Guide to Putting the SDGs to Work: 7 Strategies to Create a Successful SDG Program," Jul. 14, 2017, 9 pages.
Benevity, "A fun way to engage employees in positive action to do more good," downloaded from www.benevity.com/employee-engagement/ on Jul. 24, 2018, 7 pages.
Benevity, "Be ready when the unexpected happens, with disaster relief campaigns," downloaded from www.benevity.com/disaster-relief/ on Jul. 24, 2018, 4 pages.
Benevity, "Embrace change for the greater Good," User Focused Technology to Power Corporate Giving, downloaded from www.benevity.com/ on Jul. 24, 2018, 8 pages.
Benevity, "Employee volunteerism creates a deeper connection to your business," Volunteering—Products, downloaded from www.benevity.com/volunteering/ on Jul. 24, 2018, 6 pages.
Benevity, "Enable Goodness with accessible employee engagement software," downloaded from www.benevity.com/accessibility/ on Jul. 24, 2018, 5 pages.
Benevity, "Fundraising campaigns and giving opportunities made easy," downloaded from www.benevity.com/fundraising-campaigns/ on Jul. 24, 2018, 4 pages.
Benevity, "Helping companies help communities," downloaded from www.benevity.com/grants-management/ on Jul. 24, 2018, 8 pages.
Benevity, "Make it about engagement and watch your workplace giving programs take off," Workplace Giving—Products, downloaded from www.benevity.com/workplace-giving/ on Jul. 24, 2018, 9 pages.
Benevity, "Take your program to the next level with Goodness Consulting," downloaded from www.benevity.com/goodness-consulting/ on Jul. 24, 2018, 5 pages.
Benevity, "Transform people's passion for social Good into one-of-a-kind programs," downloaded from www.benevity.com/api-solutions/ on Jul. 24, 2018, 6 pages.
Benevity, "Unite your people all over the world with goodness," downloaded from www.benevity.com/International/ on Jul. 24, 2018, 10 pages.
Jazayeri, N., "Employee Engagement Enters the Next Generation," Salesforce.org, Jun. 28, 2018, downloaded from www.salesforce.org/employee-engagement-enters-the-next-generation/ on Jul. 23, 2018, 3 pages.
Salesforce.org, "A field guide to accelerating your nonprofit transformation," Nonprofit Cloud Digital Magazine: Issue 1, downloaded from www.salesforce.org/nonprofit/nonprofit-cloud-subscribe-emea-4/on Jul. 24, 2018, 26 pages.
Salesforce.org, "Small Nonprofit Big Impact: Break Barriers and Build Capacity with Technology," downloaded from www.salesforce.org/nonprofit/emea-e-book-small-nonprofit-big-impact4/ on Jul. 24, 2018, 18 pages.
Salesforce.org, "Philanthropy Cloud," data sheet downloaded from www.salesforce.org/introducing-salesforce-philanthropy-cloud-data-sheet/ on Jul. 24, 2018, 6 pages.
Salesforce.org, "Philanthropy Cloud for Companies," downloaded www.salesforce.org/philanthropy-cloud/philanthropy-cloud-for-companies/ on Jul. 23, 2018, 10 pages.
Salesforce.org, "Philanthropy Cloud for Nonprofits," downloaded from www.salesforce.org/philanthropy-cloud/philanthropy-cloud-for-nonprofits/ on Jul. 23, 2018, 7 pages.
Salesforce.org, "Philanthropy Cloud Infographic," downloaded from www.salesforce.org/philanthropy-cloud/philanthropy-cloud-infographic/ on Jul. 24, 2018, 5 pages.
Salesforce.org, "United Way & Salesforce.org: Partners for Good," downloaded from www.salesforce.org/philanthropy-cloud/partners-for-good/ on Jul. 23, 2018, 7 pages.
Salesforce.org, "Workplace Giving: Collective Impact and Employee Engagement All in One Purposeful Place," downloaded from www.salesforce.org/philanthropy-cloud/workplace-giving/ on Jul. 23, 2018, 13 pages.
United Way Worldwide, "United Way and Salesforce.org present Philanthropy Cloud," downloaded from www.unitedway.org/philanthropy-cloud# on Jul. 24, 2018, 6 pages.

\* cited by examiner

ATTRIBUTE-BASED ACCESS CONTROL USING A DYNAMIC EXPRESSION ENGINE

CROSS-REFERENCE TO RELATED APPLICATIONS

This application claims the benefit of U.S. Provisional Application No. 62/720,072, filed Aug. 20, 2018, which is hereby incorporated by reference.

TECHNICAL FIELD

One or more implementations relate to the field of multi-tenant platform management; and more specifically, to managing permissions and roles in a multi-tenant platform.

BACKGROUND ART

Non-profit organizations and similar entities are focused on maximizing the use of donations to service causes they champion. Accordingly, these non-profit organizations attempt to minimize overhead costs to maximize funds available for their causes. One significant source of overhead for charitable organizations is web advertising and associated services. Similarly, many for-profit organizations seek to support charitable giving by enabling employees to direct donations and services toward non-profit organizations. In this case as well, the desire is to maximize charitable giving while minimizing overhead. As a result, many for-profit organizations have developed charitable giving programs that partner with non-profit organizations to promote the charitable work the non-profit organizations perform and enable employees of the for-profit organizations to make donations to these non-profit organizations. In some cases, the for-profit organizations may match donations made by employees or provide similar support to these non-profit organizations.

A multi-tenant cloud computing platform supports one or multiple services that are made available to tenants of the multi-tenant cloud computing platform. The services are sets of functions, applications, and/or resources that may be made available on-demand to the tenants of the multi-tenant cloud computing platform. The tenants of the multi-tenant cloud computing platform can leverage these services to support their organization. Thus, an organization of a tenant does not need to be concerned with building and/or maintaining the provided services, but instead makes use of the services when needed (e.g., in response to a demand from a tenant). The services may communicate with each other and/or with one or more electronic devices external to the multi-tenant cloud computing platform via one or more Application Programming Interfaces (APIs) (e.g., a Representational State Transfer (REST) API).

The multi-tenant cloud computing platform can also provide a set of resources to tenants. For example, the resources may include a set of databases and the services use data stored within the set of databases. The set of databases may each comprise one or more database objects that are managed by a Database Management System (DBMS). Each database object may include a number of records and each record may comprise a set of fields.

In some implementations, the multi-tenant cloud computing platform may be utilized to provide services and resources to support charitable donations to non-profit organizations. However, these services and resources are restricted to those made available by a provider of the multi-tenant cloud computing platform. For example, the provider may not be focused on supporting charitable activities and thus these services and resources may provide limited support for charitable donations of employees of tenants.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 7 is a diagram of one implementation of a corporate social responsibility portal.

FIGS. 8A and 8B are diagrams of one implementation of a content management interface enabling configuration of a scope of visibility and fund management.

DETAILED DESCRIPTION

Figure 1:
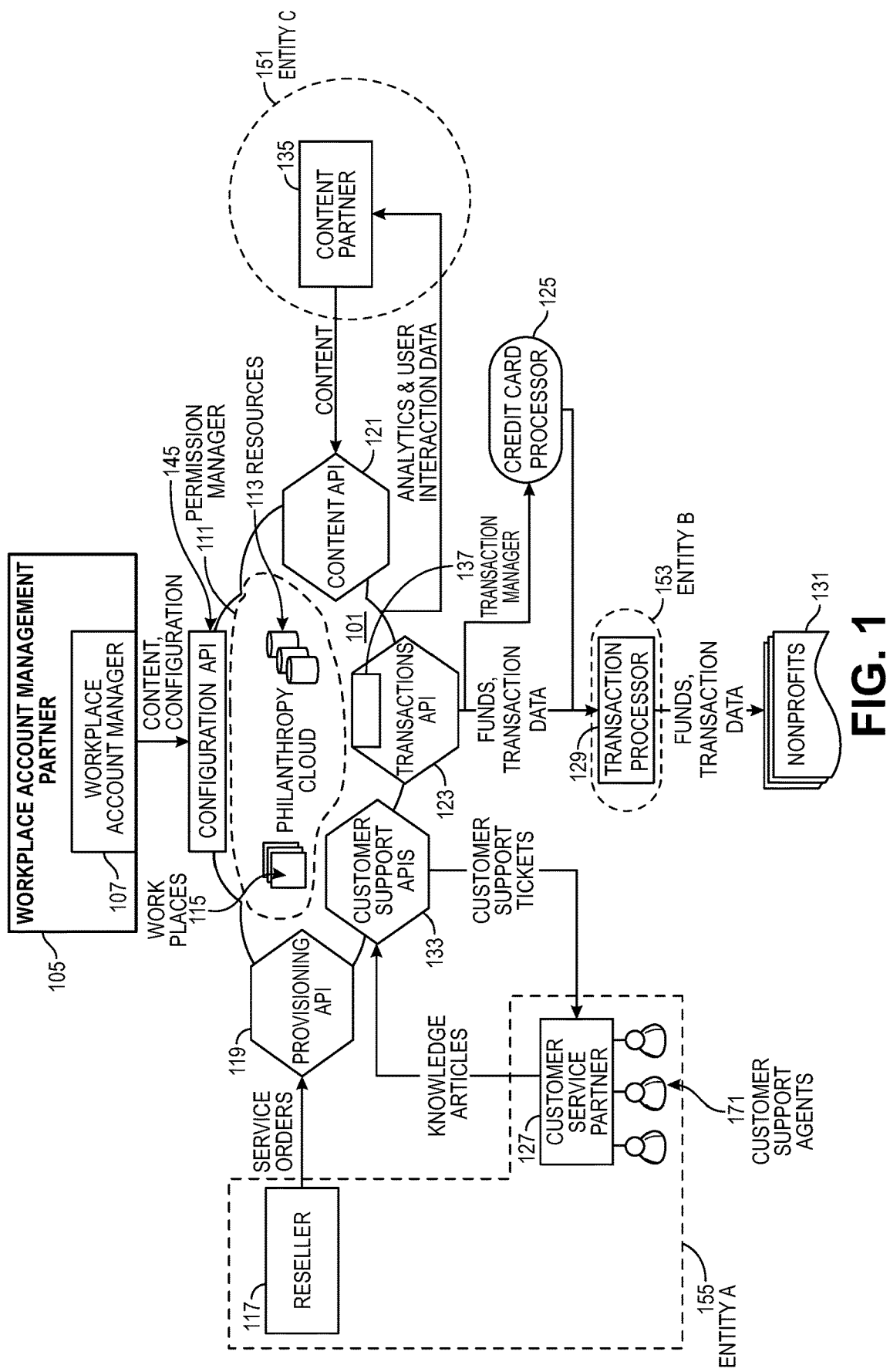
FIG. 1 is a block diagram of a philanthropic cloud platform that implements corporate social responsibility programs with support for external organizations to have defined roles.

The following description describes methods and apparatuses for providing a philanthropy cloud platform that is a multi-tenant cloud computing service, where roles within a corporate social responsibility program provided by the philanthropy cloud platform can be shared with organizations external to the philanthropy cloud platform and where the philanthropy cloud platform includes attribute-based access controls that securely manage support roles and sharing of resources between workplaces within the philanthropy cloud platform.

The implementations of the philanthropy cloud platform provide a permissions manager that implements a high-performance and flexible expression-based policy engine for providing fine-grained permissions to system and application resources at runtime. This permissions manager is used to secure philanthropy cloud platform microservices and resources. In addition, the permissions manager can be exposed to tenants and associated users of the philanthropy cloud platform to secure their application-specific resources. The permissions manager is based on attribute-based access control (ABAC). The permissions manager makes authorization decisions and can be implemented as a microservice. The permissions manager can make authorization decisions that combine a set of attributes. These attributes can be defined in separate data structures. In one example implementation, the data structures are in JavaScript Object Notation (JSON) or a similar format. For sake of clarity and convenience, the example implementation of data structures in JSON is utilized herein by way of example and not limitation. One skilled in the art would understand that similar data structures and formats could be utilized with similar properties as JSON. The permissions manager also evaluates input states using a set of rules written using a well-defined expression syntax, such as the JSONata expression syntax. These rule expressions are themselves a part of the state that is input to the permission manager. The permission manager enables control of resources within the philanthropy cloud by organizations, their users, and related entities within and external the philanthropy cloud platform.

The philanthropy cloud platform also utilizes the permissions manager to support roles that are implemented by entities external the philanthropy cloud platform. Any number of supporting roles can be defined for a philanthropy cloud platform. Example supporting roles include a reseller, customer support partner, transaction processor, content partner, and workplace account manager. An organization with a 'reseller' role markets the philanthropy cloud platform to interested customers, culminating in a contract and service order submitted to the provider of the philanthropy cloud platform. The reseller provides sales enablement and marketing support to partners in the philanthropy cloud platform.

An organization with a 'customer service partner' role provides technical support to tenant organizations, workplaces, and associated users in the philanthropy cloud platform. The customer service partner can also escalate issues to the philanthropy cloud platform provider when the customer service partner is not able to resolve the issues themselves. An organization with a 'workplace account management partner' role provides account management services to tenant organizations, workplaces, and associated users, including critical tasks such as user onboarding and education, campaign content development, campaign outreach/marketing to tenant organization users, campaign reporting and strategic campaign management. In the philanthropy cloud platform, tenants in the underlying multi-tenant cloud computing system are structured as organizations, with a set of workplaces. These tenant organizations have associated resources, users, and roles assigned to these users that are used to define access to resources for the users within a workplace. Access to resources between workplaces, including workplaces associated with separate tenant organizations, is possible as further discussed below.

In some implementations, support roles also include a transaction processor, which is an organization that assists in the processing of donated funds from employees (e.g., users of a tenant organization), and as needed, may pass such funds to a beneficiary charitable organization (i.e., a non-profit organization) designated by the donor (i.e., a tenant organization user). The transaction processor manages accounting, legal, and/or banking logistics to ensure proper handling of donations and the related financial transactions for the philanthropy cloud platform, workplaces, and beneficiaries (e.g., non-profit organizations).

The support roles may also include content partners (sometimes referred to as service partners). Content partners are organizations and associated users that create or curate content for workplaces in the philanthropy cloud platform. The content can be any type of audio, graphical, video, interactive or similar piece of content. The content partner can design the content to be descriptive and/or persuasive to support charitable campaigns and corporate social responsibility programs for tenant organizations.

The philanthropy cloud platform allows these support roles to be independently assigned to appropriate organizations external to the philanthropy cloud platform and allows individual users in these external organizations to access affordances for performing specific tasks that are appropriate to each of their support roles and responsibilities in the overall philanthropy cloud platform. A single organization and/or associated user may hold one or more support roles in connection with a tenant organization in the philanthropy cloud platform. These features of the philanthropy cloud platform are described in further detail with reference to example implementations.

FIG. 1 is a block diagram of a philanthropic cloud platform 101 that implements corporate social responsibility programs with support for external organizations to have defined supporting roles to facilitate the corporate social responsibility programs. The philanthropy cloud platform 101 is a multi-tenant cloud computing system. The philanthropy cloud platform 101 includes any number of computing devices, storage devices, and similar resources to provides services to its tenant organizations who are represented within the philanthropy cloud platform 101 using an object model by associating tenant organizations with a set of workplaces 115. The workplaces 115 encompass a set of users, services, and resources associated with a tenant organization. For example, a corporation can be a tenant organization that utilizes the philanthropy cloud platform 101 for corporate social responsibility programs for its employees. A given corporation may have sub-divisions or similar corporate structures, such that users and resources are separated into different workplaces 115. The resources 113 within the philanthropy cloud platform 101 can include databases storing content and data for the corporate social responsibility programs. A permission manager 111 can manage access to the resources 113 by enforcing policies whereby users have limited access to the resources 113 based on associated attributes, as discussed further below.

The philanthropy cloud platform 101 enables supporting roles that are used by entities external to the philanthropy cloud platform 101 by providing a corresponding application programming interface (API) or similar access mechanism through which the organizations and associated users that are operating in these supporting roles can access the resources 113 of the philanthropy cloud platform 101. Each API services access requests from the external systems of organizations serving in supporting roles and upon approval of the permission manager 111 enables the external systems to access resources 113 of the philanthropy cloud platform 101 to carry out the functions of the associated supporting role. For supporting roles of reseller, customer service partner, transaction processor, content partner, and workplace account management partner, respective APIs can be defined such as provisioning API 119, customer support API 133, transaction API 123, content API 121, and configuration API 145, respectively.

The implementation of the philanthropy cloud platform 101 enables tenant organizations, their workplaces 115, and their users to not have to depend on a single vendor or provider for all of the different services/aspects of running a corporate social responsibility program that are handled by the supporting roles. The philanthropy cloud platform 101 enables these responsibilities to be formalized and disentangled from each other such that tenant organizations, their workplaces 115, and their users can have a choice of providers for these supporting roles, increasing efficiency and service quality while decreasing cost. The philanthropy cloud platform 101 can thereby create a vigorous, healthy market ecosystem of organizations offering different kinds of services to the tenant organizations, users, and workplaces 115.

The term "user," as used herein, is a generic term referring to an entity (e.g., an individual person) using a system and/or service. A multi-tenant architecture provides each tenant with a dedicated share of a software instance and the ability to input tenant specific data for user management, tenant-specific functionality, configuration, customizations, non-functional properties, associated applications, and similar functionality. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, or similar entity) referred to herein as a tenant organization. A tenant organization in the philanthropy cloud platform may have one or more support roles defined to provide functions for a corporate social responsibility program.

A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

In the philanthropy cloud platform 101, the tenant organizations may be represented as a set of workplaces 115 that are participating in a corporate social responsibility program. As discussed above, the corporate social responsibility program can be divided into supporting roles for handling different functions related to the operation of the corporate social responsibility program. The supporting roles may include a reseller role, a customer service partner role, a workplace account manager role, a transaction processor role, and a content partner role. The philanthropy cloud platform 101 allows these roles to be independently assigned to any number and configuration of appropriate organizations and allows individual users in these organizations to be able to access resources sufficient to perform specific tasks that are appropriate to each of their roles and responsibilities in the overall philanthropy cloud platform 101. Any of these organizations and their users may hold one or more supporting roles as determined by the tenant organizations and/or the philanthropy cloud platform 101 using a defined object model and a permissions manager 111 to ensure that organizations and users have access to resources according to their supporting roles and relationships with tenant organizations within the philanthropy cloud platform 101.

For example, a single entity A 155 can serve as a reseller 117 and a customer service partner 127 for a single tenant organization or workplace 115 or for multiple tenants or workplaces 115. In other cases, a single entity, e.g., Entity B 153 or Entity C 151 can serve in the supporting role of a transaction processor 129 or content partner 135, respectively. Any number of entities can operate in any given role or in any combination of possible roles to provide a competitive and robust environment for tenants or workplaces 115 to obtain the functions and services associated with that supporting role. An 'entity,' as used herein can be any legal entity, such as an organization (e.g., a corporation or non-profit) or an individual. The supporting roles can also be sub-divided within an organization that is providing the service. The organization can have sub-divisions and users that may operate with a particular supporting role within the set of supporting roles.

In one implementation, organizations serving as resellers 117 in support of a philanthropy cloud platform 101 market and advertise the functions and services of the philanthropy cloud platform 101 to offer these services to other parties who can become new tenants of the philanthropy cloud platform 101. The resellers 117 include reseller systems that are a set of electronic devices configured and managed by the reseller 117 that execute client software or general-purpose software for interfacing with the philanthropy cloud platform 101. The reseller 117 is granted permission to instantiate service orders through a provisioning API 119. The reseller systems thereby are granted access to the philanthropy cloud platform 101 to configure new tenants and workplaces 115 for these tenants as well as to define the access of these new tenants to the resources 113 of the philanthropy cloud platform 101.

Each tenant or workplace 115 can be assigned to a customer service partner 127. The customer service partner 127 is connected to the philanthropy cloud platform 101 through a customer support API 133. The customer support API 133 can provide functions for accessing resources related to customer support services, such as a relational database engine in which customer support tickets and knowledge articles are stored. In one implementation, each customer service partner 127 is associated with one or more support ticketing systems. The philanthropy cloud platform 101 can dynamically route user support cases originating with tenants and their users to the appropriate support ticketing system based on a customer service partner 127 associated with the tenant in the object model. The support ticketing system can queue submitted tickets for action by the customer service partner's 127 customer support agents 171.

The customer support partner 127 system allows associated tenant or workplace users to view and interact with their support tickets and allows customer support agents 171 limited access to the philanthropy cloud platform 101 and the workplaces 115 to troubleshoot issues on behalf of the users of the associated workplaces 115. In addition, the philanthropy cloud platform 101 can index support documentation from across multiple customer service partners 127, support ticketing systems, and correlated systems to present appropriate documentation resources to each workplace user of the philanthropy cloud platform 101. Thus, the customer service partner 127 and the customer support APIs 121 can support multiple workplaces 115, multiple specific software products, multiple resources, and similar aspects of the philanthropy cloud platform 101 to assist any number or workplace 115 users across multiple workplaces.

In some implementations, each tenant organization is also assigned a workplace account management partner 105 through a configuration API 145. The configuration API 145 can provide access, in accordance with the permissions manager 111, to resources 113, such as relational database engines. Workplace account management partners 105 can assign individual workplace account managers 107 to a tenant organization or workplace 115. Workplace account managers 107 have certain administrative permissions for tenant organization workplaces 115 and can assist tenant organization users and administrators with configuration and content creation tasks within these workplaces 115. A workplace account management partner 105 can be associated with any number of tenant organizations and related workplaces 115. A workplace account manager 107 can be a user of the workplace account management partner 105 that is specific to a workplace 115 or that assists multiple workplaces 115.

In some implementations, each tenant organization or workplace 115 is assigned a default intermediary transaction processor 129. Transaction processors 129 connect a payment processing account to the philanthropy cloud platform 101 and can then receive charitable donations from users of workplace 115 and, outside of the philanthropy cloud platform 101, can subsequently pass the donations to additional non-profits 131 that the user may designate. Individual nonprofits 131 can also be transaction processors 129 and receive donations directly. In the event that there are multiple intermediary transaction processors 129, a transaction manager 137 tracks which nonprofits 131 each intermediary transaction processor 129 can distribute to, and their cost for doing so. In this manner, the philanthropy cloud platform 101 can choose the most efficient/lowest-cost option for routing funds to a given nonprofit 131. Transaction processors 129 can work with banks, credit card companies, and similar financial institutions 125 to coordinate the processing of donations and related transactions based on tenant organization, workplace 115, or user preference.

In some implementations, the philanthropy cloud platform 101 is open to multiple content partners 135 and/or similar service providers. Content partners 135 and/or similar service providers can create content on the philanthropy cloud platform 101 via a user interface (UI) or via a content creation API 121 and can retrieve information about workplace 115 user interactions/transactions with their content (e.g., donations, sign ups, etc.) through several APIs. A content partner 135 can provide content for any number of workplaces 115 as determined by the permission manager 111 and the preferences of the workplaces 115 on sharing content of the content partner 135. Any number of content partners 135 can provide content that is accessible to any number of workplaces 115 and workplace users as managed by the permission manager 111. In addition, content partners 135 can receive analytics and user interaction data from the philanthropy cloud platform 101 that is collected by the platform 101, workplaces 115, and resources 113 that enable the content partner 135 to track user participation and similar metrics of user consumption of the content.

Enabling these supporting roles to have external managed access to the resources 113 of the philanthropy cloud platform 101 provides a platform with an innovative combination of components in the context of managing corporate social responsibility programs and individual engagement with charitable causes generally. Further, the transaction manager 137 implementation of a lowest-cost funds routing of transactions or similar tenant or tenant user preference-based routing is an improvement in the routing of charitable donations to nonprofits 131.

Figure 2:
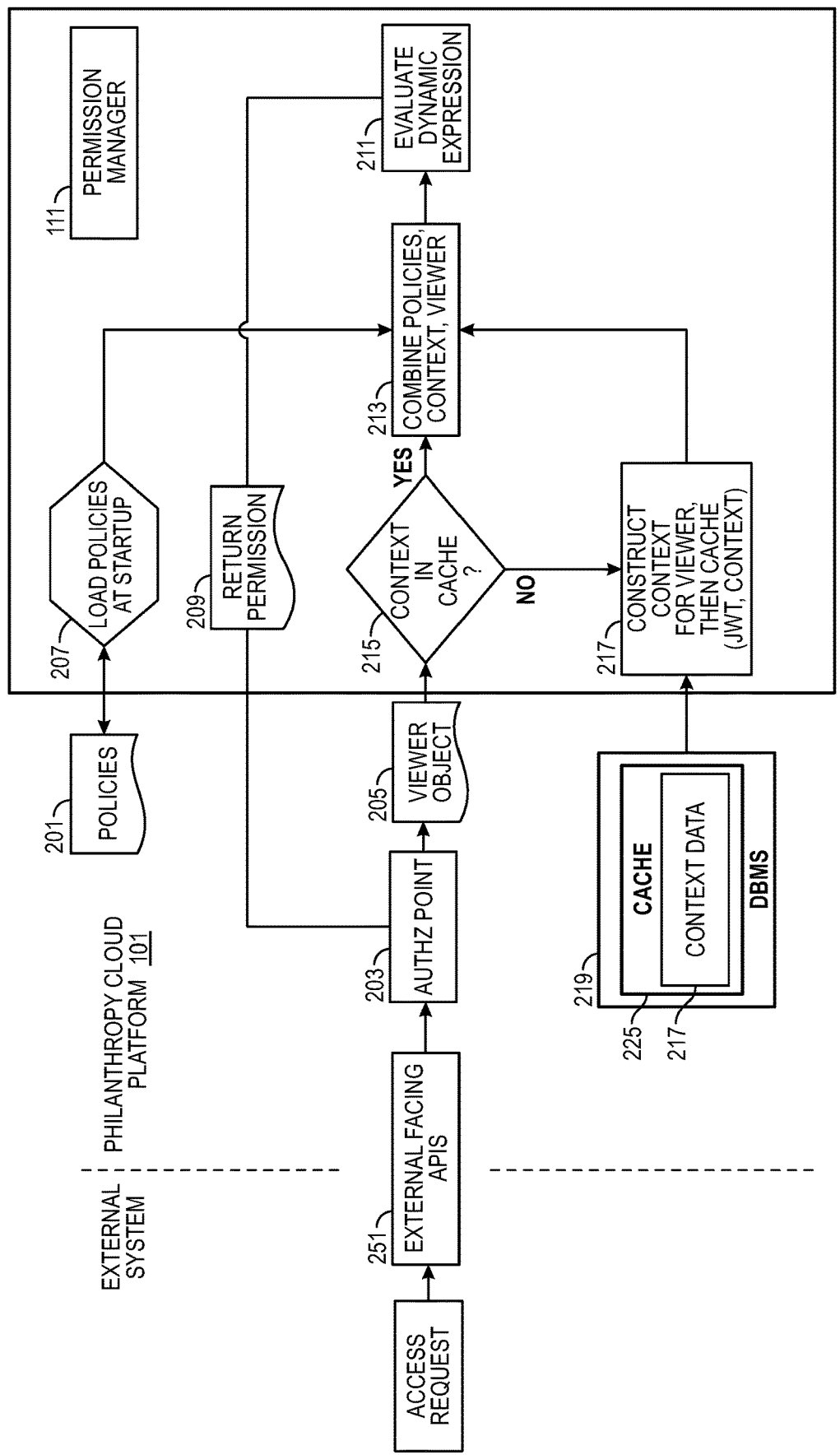
FIG. 2 is a block diagram illustrating a dynamic expression engine according to some example implementations.

FIG. 2 is a block diagram illustrating a dynamic expression engine according to some example implementations. The dynamic expression engine, as illustrated, can function as the permission manager 111 for the philanthropy cloud platform. A 'dynamic expression,' as used herein is a code based or natural language description of logical actions that can be evaluated by the permission manager 111 such as an identification of a set of criteria within context data that can be checked to determine permissions for a given resource. The permission manager 111 interfaces with external facing APIs, user interfaces, and tenant applications seeking to access resources 113 within the philanthropy cloud platform 101 or manage policies for the permission manager 111. The external facing APIs 251, user interfaces, and tenant applications can generate requests for resource 113 access via authorization points (AuthZ) 203, which are micro-services for handling these requests. Any number of authorization points 203 can be utilized to service these resource requests for the philanthropy cloud platform 101.

The permissions manager 111 caches context data required to make authorization decisions for these resource requests. The context data includes environment data from the philanthropy cloud platform 101 and session information for users connecting to the philanthropy cloud platform 101 via the APIs and authorization points 203. The context data may be maintained in a JSON format and stored in a database management system (DBMS) 219. In one implementation, the caching is optimized by generating context data 217 that is stored in the context cache 225 in response to a first resource request where a context is found not to exist (Block 215) in the DBMS 219 and keying the context data in the cache 225 to a user's session. In one implementation, when the user session expires, their context cache 225 can be emptied. This cache 225 can be force-emptied and rebuilt if anything in the context cache 225 changes.

A user that is an administrator of the philanthropy cloud platform 101, a tenant user, or similar user can generate and install policies 201. Policies 201 are dynamic expressions that are written to protect resources and tenants and can return any string expression as the result of a decision, which could be true/false, or a complex set of granular instructions on what level of access is allowed. Policies 201 can be defined in a JSON format, with a special field for the policy expression or using a similar language and/or data format. Policies 201 can also be stored in the DBMS 219 or a similar location within the philanthropy cloud platform 101.

In some implementations, a request for access received by an authorization point 203 includes a viewer object 205. The viewer object 205 includes an identifier or definition of who the user, entity, or application that is requesting an identified resource 113, as well as information about what the actor is seeking to execute or modify. The authorization point 203 can forward this viewer object 205 to the permission manager 111 or generate the viewer object 205 for the permission manager 111 from data in the request received from the external facing APIs or applications.

In some embodiments, policy expressions are written using the JSONata expression language, which efficiently parses through any arbitrarily structured JSON document to do complex operations on the data. In the permission manager 111, policies 201, context data 217, and resource request data (i.e., a viewer object 205) can be combined into one document (Block 213), and the permission manager 111 can evaluate expressions to efficiently do logical compares on the context data 217, the viewer object 205, and apply the relevant policies 201 (Block 211). In this implementation, because this information is all combined in one document (in memory), evaluations are efficient. Because the policy expressions have visibility to the entire document (all context data 217, all policies 201, and all viewer object 205 information) expressions can reach across any level of the system state to make decisions. Policy expressions can be written with JSONata or any well-defined and complete programming or expression language capable of performing similar evaluations. In the case of JSONata, this technology also allows JavaScript functions in addition to efficient JSON searching and parsing to be utilized.

Policies 201 can be input/loaded (Block 207) by any entity enabled to define policies 201 for a tenant organization or workplace 115. The policies 201 define permissions (e.g., ABAC) using an expression language, such as JSO- Nata, and indicate the contexts and viewers that are allowed to access given resources 113. The philanthropy cloud platform 101 may provide a tool kit (e.g., an ABAC toolkit) or a similar UI for generating policies 201.

The authorization point 203 allows access to various resources in the philanthropy cloud platform 101 at various levels based on the permissions returned from the permission manager 111 that makes decisions based on policies 201 and the role of the requestor, the context data 217, and the requested resource 113. By writing policies 201 tuned to work-specific roles of requestors, properly scoped access to philanthropy cloud platform 101 resources 113 can be granted. Access can also be scoped to multiple roles. For example, if a user holds the role of transaction processor 129 and workplace account management partner 105, then the policies 201, viewer object 205, and context data 217 can be evaluated by the permission manager 111 to allow access to philanthropy cloud platform 111 resources 113 available to both roles. Similarly, access to create and curate content for a given tenant organization can be granted across multiple roles, or restricted to a single role, such as a content partner.

In some implementations, different scoping rules can be dynamically assigned to different tenant organizations of the platform 101. Tenant organizations can also have the ability to write their own policies 201 for roles they create and assign within their organizations or in association with their organizations. For example, a workplace account manager 107 may want to assign a person in the workplace 115 to create content for that workplace 115. They can use the policy engine of the permission manager 111 to dynamically scope that user's access to content of that workplace 115. The philanthropy cloud platform 101 and the permission manager 111 can also quarantine the scope to only items belonging to the workplace 115 of that user.

Figure 3:
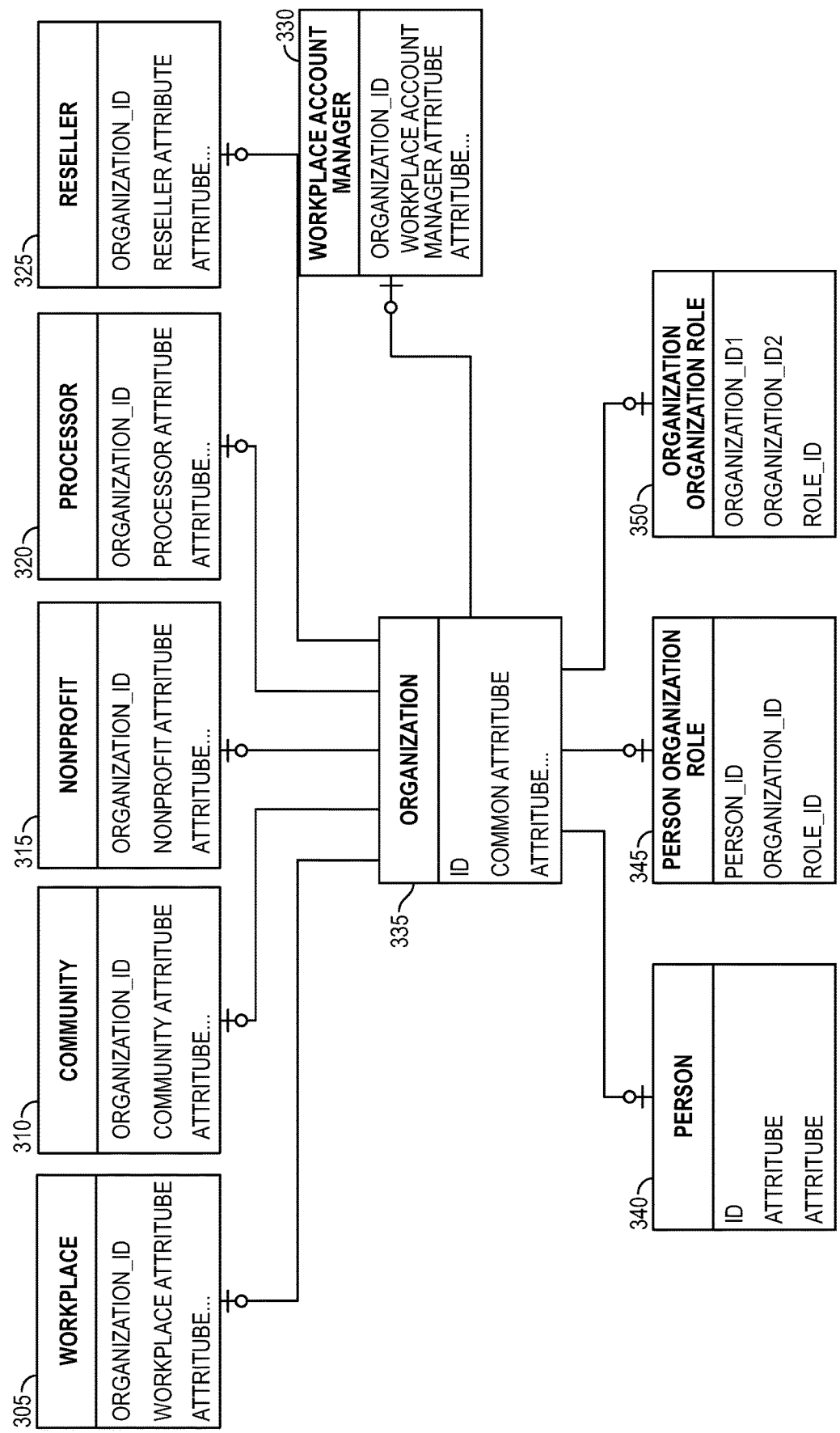
FIG. 3 is an object model illustrating a philanthropic network according to some example implementations.

FIG. 3 is an object model illustrating a philanthropic network according to some example implementations. The example implementation illustrates a case where an organization 335, for example a tenant organization, can be represented as a set of inter-related data structures. The organization 335 includes an identifier (id), a set of common attributes, and a set of attributes. The common attributes indicate a set of shared attributes across the organization, and the attributes indicate organization attributes. An attribute can be any property or data managed within the philanthropy cloud platform 101. Users associated with an organization can have an associated person profile 340 including an identifier and set of attributes. The attributes of a person can include any attributes relevant to a user. The model can include a structure for a person organization role 345 that includes an identifier for a person, an identifier for the organization, and an identifier for the role. A person in the object model represents a user of an organization, such as a user of a tenant organization. The object model also can include a person organization role 350 structure that includes a person identifier, a set of organization identifiers and a role identifier. The person organization role 345 structure can be utilized to define the roles for the associated person, e.g., a user of a tenant organization.

Each organization 335 can be associated with a set of entities with supporting roles, including a workplace 305, a community 310, a nonprofit 315, a transaction processor 320, a reseller 325, and a workplace account manager 330. Each of these entities with supporting roles can be defined by a corresponding structure that includes an identifier for the organization and a set of attributes. A workplace 305 includes a workplace attribute that defines attributes relevant to a workplace environment and a set of generic attributes that define attributes not specific to the workplace environment. A community 310 includes a community attribute that defines community specific attributes and a set of generic attributes. A nonprofit 315 includes a nonprofit attribute and a set of generic attributes. A transaction processor 320 defines a processor attribute and a set of generic attributes. A reseller 325 includes a reseller attribute and a set of generic attributes. A workplace account manager 330 includes a workplace account manager attribute and a set of generic attributes. As shown in FIG. 3, each of the workplace 305, the community 310, the nonprofit 315, the transaction processor 320, the reseller 325, and a workplace account manager 330 data structures include an organization identifier corresponding to an associated organization 335.

Figure 4:
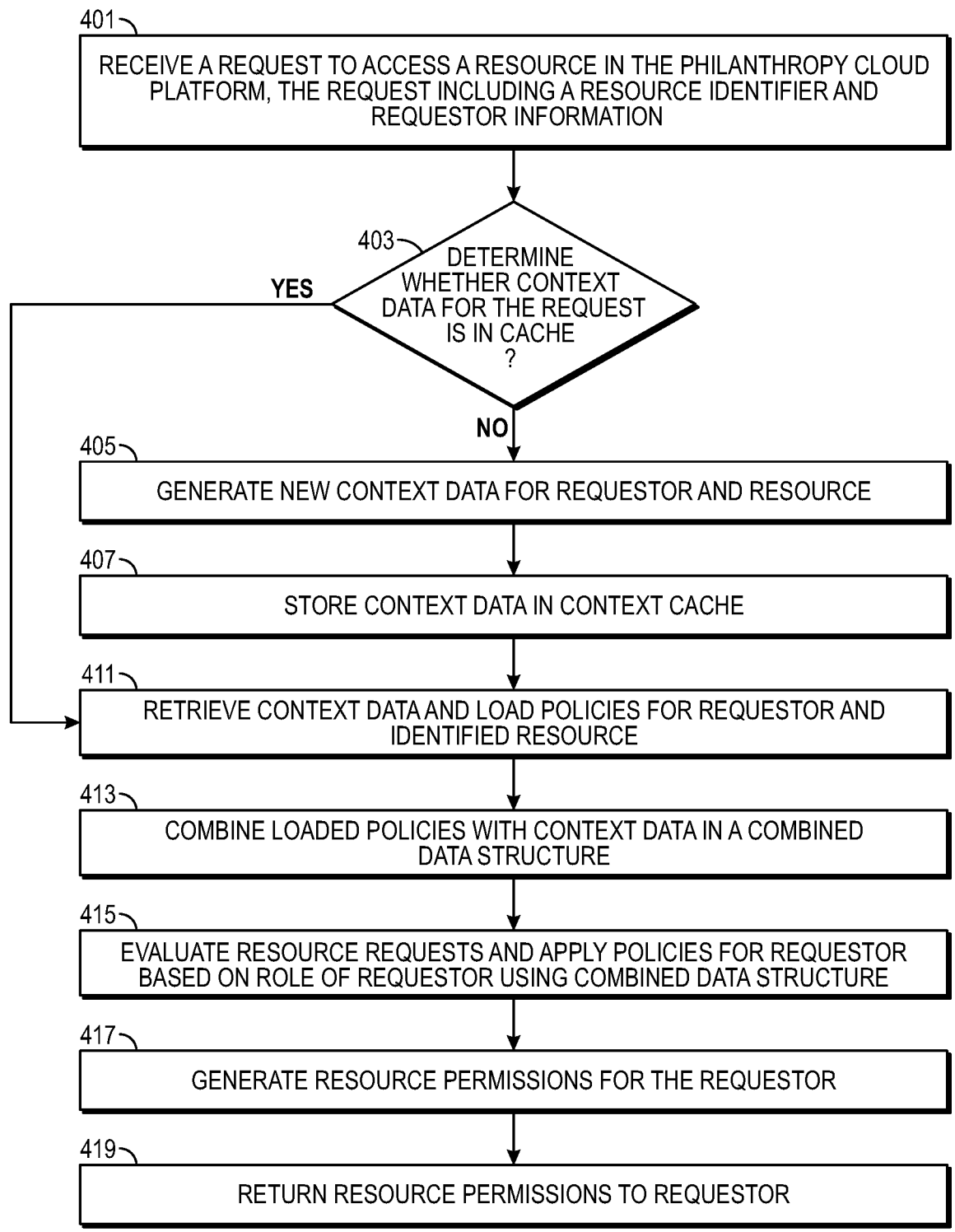
FIG. 4 is a flowchart of one implementation of a process for attribute-based access control implemented by a dynamic expression engine.

FIG. 4 is a flowchart of one implementation of a process for attribute-based access control implemented by a dynamic expression engine. The dynamic expression engine can be implemented as the permission manager 111 as discussed herein above. The permission manager 111 receives requests for access to philanthropy cloud platform 101 resources 113 (Block 401) and determines whether a requestor has sufficient access rights to be allowed to access the requested resource 113. A resource 113, as used herein, can be a hardware resource or software resource, including tenant organization data, functions, applications, computing and storage utilization and similar resources of the philanthropy cloud platform 101. The request can identify a resource 113 to be accessed by including an identifier for the resource as well as requestor information within the request sent to the philanthropy cloud platform 101. The request can be received via an externally facing API, a UI, functions, or applications of a tenant organization or similar entity. Requestor information can include an identifier for any role within the philanthropy cloud platform 101 that is associated with a requestor. The requestor information and resource identification can be provided or managed as part of a viewer object 205 in a JSON format.

In response to the resource request, the process initiates a check of a cache in the philanthropy cloud platform 101 to retrieve context data 217 for the request (Block 403). The request can be tied to the requestor and the associated context data 217 can also be requestor specific and stored in a local database functioning as a context cache (e.g., cache 225). The context data 217 can include any available data relevant to assessing resource requests and for applying policies 201. Thus, the check of the context cache (e.g., cache 225) is made to locate the appropriate context data 217. In some embodiments, the check accesses the context cache to find context data 217 for a requestor and for a requested resource.

In some cases where existing context data 217 is not found, the permission manager 111 generates new context data 217 for a user (i.e., a requestor) and resource 113 pair that has not been previously handled (Block 405). The permission manager 111 can then store the new context data 217 in the context cache, which may be stored in a DBMS (Block 407). If the context data 217 is found or has been successfully created, then policies 201 for the requestor and the requested resource 113 can be loaded (Block 411).

The permissions manager 111 can combine the retrieved and loaded policies 201 with the context data 217, requestor information, and resource information to create a document or data structure for evaluating the overall resource request (Block 413). With the information combined, then the policies 201 can be evaluated for the resource request and based on the requestor information, such as the role of a requestor in a workplace 115 or in the philanthropy cloud platform 101. The evaluation can be carried out by an expression evaluation engine that parses the combined document to identify dynamic expressions and the required data within the document to evaluate the dynamic expressions, which are logical expressions that will identify and output a set of permissions for the philanthropy cloud platform (Block 415). The output of the evaluation is a set of resource permissions specific to the requestor marshalled into a data structure to be returned to the requestor (Block 417), which are then returned to the requestor (Block 419). The resource permissions can be provided to an API, application, UI, or similar component that enables the requestor to access the identified resource 113.

Figure 5:
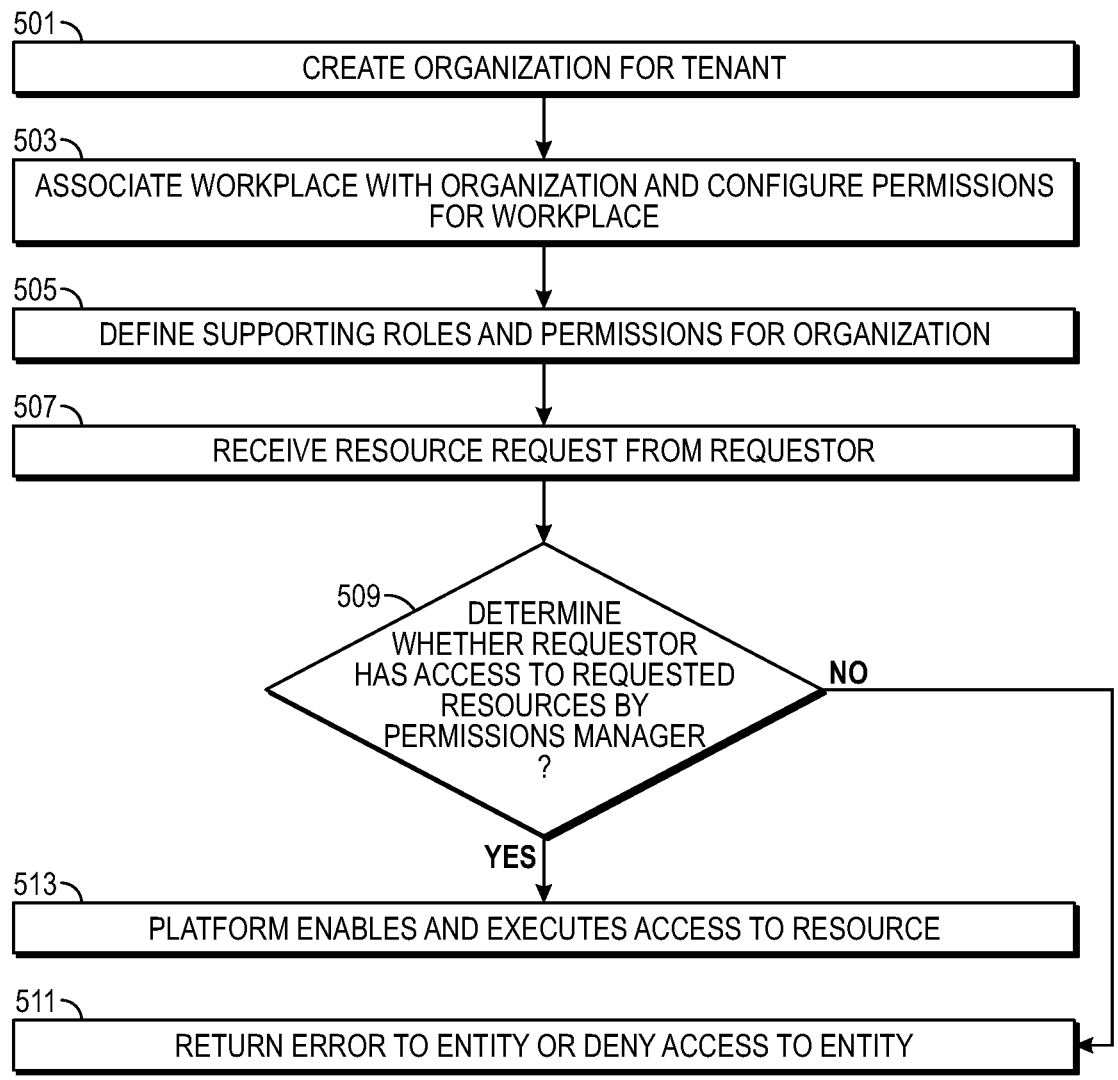
FIG. 5 is a flowchart of one implementation of a process for assigning roles to supporting organizations for a corporate social responsibility program.

FIG. 5 is a flowchart of one implementation of a process for assigning roles to supporting organizations for a corporate social responsibility program. The example implementation illustrates a configuration of a workplace 115 for a tenant organization such as a corporation or similar tenant organization of the philanthropy cloud platform 101. To set up a tenant organization in the philanthropy cloud platform 101, the tenant organization can be established as an organization using an object model (e.g., the object model of FIG. 3) if it does not already exist in the philanthropy cloud platform 101 (Block 501). Once an organization structure is created for a new tenant organization, the tenant organization will have an organization identifier enabling other supporting roles to be generated and associated with the organization structure. The workplace role is generated in the philanthropy cloud platform 101 according to the platform object model and the organization identifier is added to the workplace 115 role to associate it with the organization (Block 503). An administrator can also generate policies 201 or similarly configure the permissions manager 111 to enable the entity to perform the role of the workplace 115 including creating users for the workplace 115 for the entity. The entity can interface with the philanthropy cloud platform 101 via specialized client applications or general applications like web browsers to view content, access workplace 115 data, manage workplace 115 data, execute workplace 115 applications, and perform similar functions.

With an established organization and workplace 115 defined by philanthropy cloud platform 101 administrator, users with appropriate permissions in the organization or workplace 115 or philanthropy cloud platform 101 administrators can define other entities as providing additional support roles such as reseller 117, content partner 135, transaction processor 129, customer service partner 127, or workplace management partner 105, as well as other support roles defined by the organization of the philanthropy cloud platform 101 (Block 505). In addition to assigning these support roles to any number or combination of entities that are separate from or include the entity associated with the organization, the correlated permissions are defined to enable role related access to philanthropy cloud platform 101 resources 113 by these entities via the APIs that are specific to or that service a given supporting role. For example, an entity may be assigned to be a content partner 135 for an organization and policies 201 are provided to the permission manager 111 to enable the content partner 135 to access resources 113 of the organization and its workplace 115 in the philanthropy cloud platform 101 through the content API 121.

Once supporting role entities are configured, they can perform their intended functions by accessing the philanthropy cloud platform 101 via the role APIs using dedicated client software or general-purpose applications such as web browsers (Block 507). In the example of a content partner 135, the content partner 135 may upload web page content for a corporate social accountability program campaign to be stored in a DBMS of the philanthropy cloud platform 101 or a similar storage that will be accessed by users of the workplace 115 or organization to view information about the program that was developed by the content partner 135. FIGS. 8-10 discussed further herein below provide an example implementation of such content for a campaign.

When an entity (e.g., a user of a tenant organization or organization with a supporting role) attempts to access the philanthropy cloud platform 101 resources 113 to provide its services and perform its functions, the permissions manager 111 checks the supporting role of the entity, the policies 201 that are applicable and decides, as discussed further herein above, whether to enable access to the resources 113 requested by the entity (Block 509). Where the entity has insufficient access permissions, the permissions manager 111 returns an error to the entity and/or denies resource 113 access to the entity (Block 511). If the role of the entity and the applicable policies 201 are determined to enable the resource access request, then permission is granted, and the resource access request can be executed by the philanthropy cloud platform 101 (Block 513). In this manner, the philanthropy cloud platform 101 enables the establishment and secure execution of the distribution of the roles of the corporate social responsibility program to a flexible set of entities with tailored levels of access to the resources of the philanthropy cloud platform 101.

Figure 6:
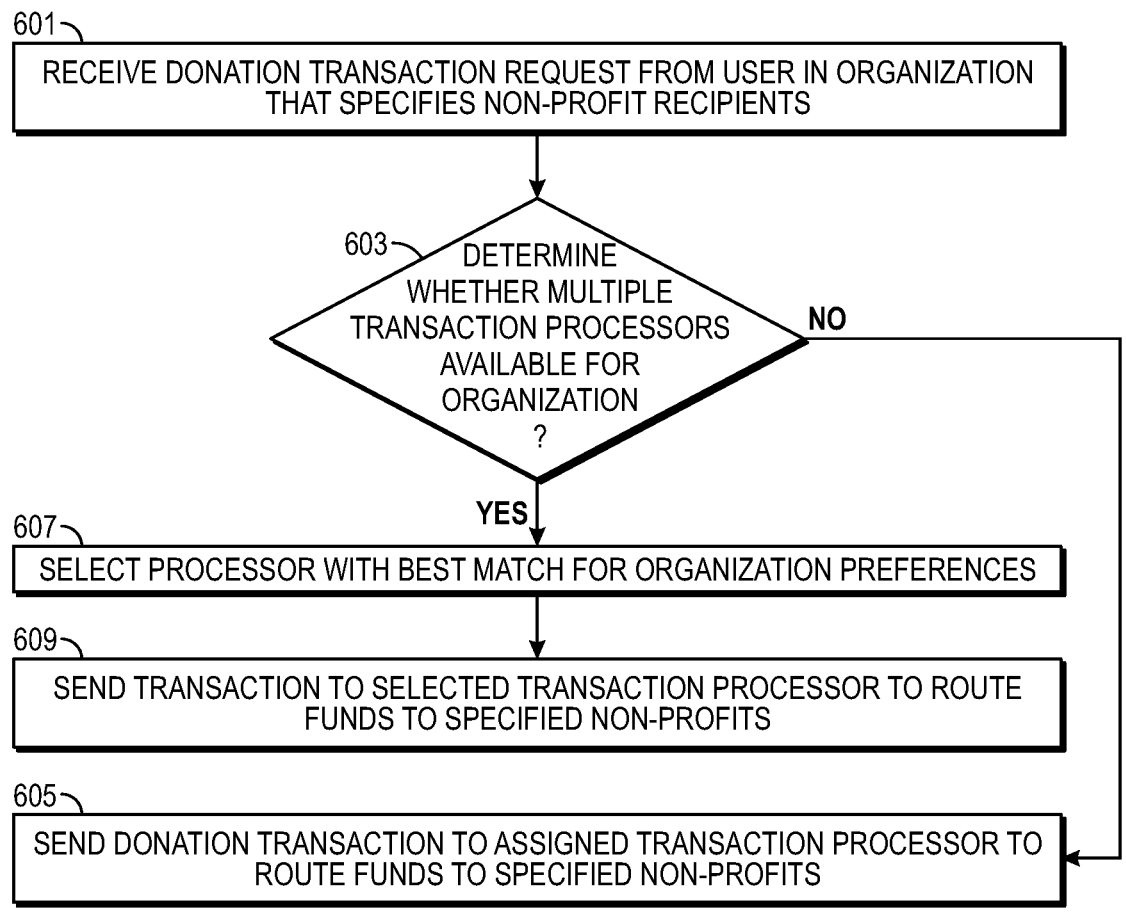
FIG. 6 is a flowchart of one implementation of a process for managing donation transactions.

FIG. 6 is a flowchart of one implementation of a process for managing donation transactions. In one implementation, the philanthropy cloud platform 101 is utilized to enable the collection and distribution of donations and similar charitable contributions from users associated with a workplace 115 or tenant organization to a set of non-profits that are selected by these users to receive donations as part of the corporate social responsibility program of the associated tenant organization. The users may select a set of non-profits to receive donations using content provided by a content partner that describes the corporate social responsibility program campaign and the non-profits. The user selects one or more of these non-profits to receive a donation and may input financial information such as bank account or credit card information to draw funds for the donation (Block 601). The tenant organization has at least one transaction processor 129 configured in a supporting role.

A transaction manager 137 in the philanthropy cloud platform 101, determines whether multiple transaction processors 129 are available to service this donation for the tenant organization and user (Block 603). The transaction manager 137 can consult the organization structure and determine a number of transaction processors 129 as well as the characteristics or attributes of the available transaction processors 129. If there is only one available transaction processor 129, then the transaction manager 137 can send the donation transaction to the assigned transaction processor 129 to route funds to the set of specified non-profits (Block 605). The transaction processors 129 can interface with banking and credit card processing systems 125 to make funds transfers to the intended non-profit recipients while managing the required legal and accounting bookkeeping for the tenant organization and the user, which is reported back into the philanthropy cloud system 101.

If there is more than one available transaction processor 129, then the transaction manager 137 selects one of the available transaction processors 129 that is a best match for tenant organization or user preferences (Block 607). Organizations and user can specify a set of criteria or attributes for a transaction processor 129 that enable the transaction manager 137 to compare the preferences to the attributes of the available transaction processors 129 to make a determination of a best match. For example, an organization or user may indicate that it prefers a lowest processing fee in which case the transaction manager 137 selects the available transaction processor 129 with the lowest processing fees. Once the transaction processor 129 is selected, then the transaction manager 137 forwards the transactions to the transaction processor 129, which will carry out the specified transactions and route the indicated funds to the set of non-profits (Block 609).

Figure 7:
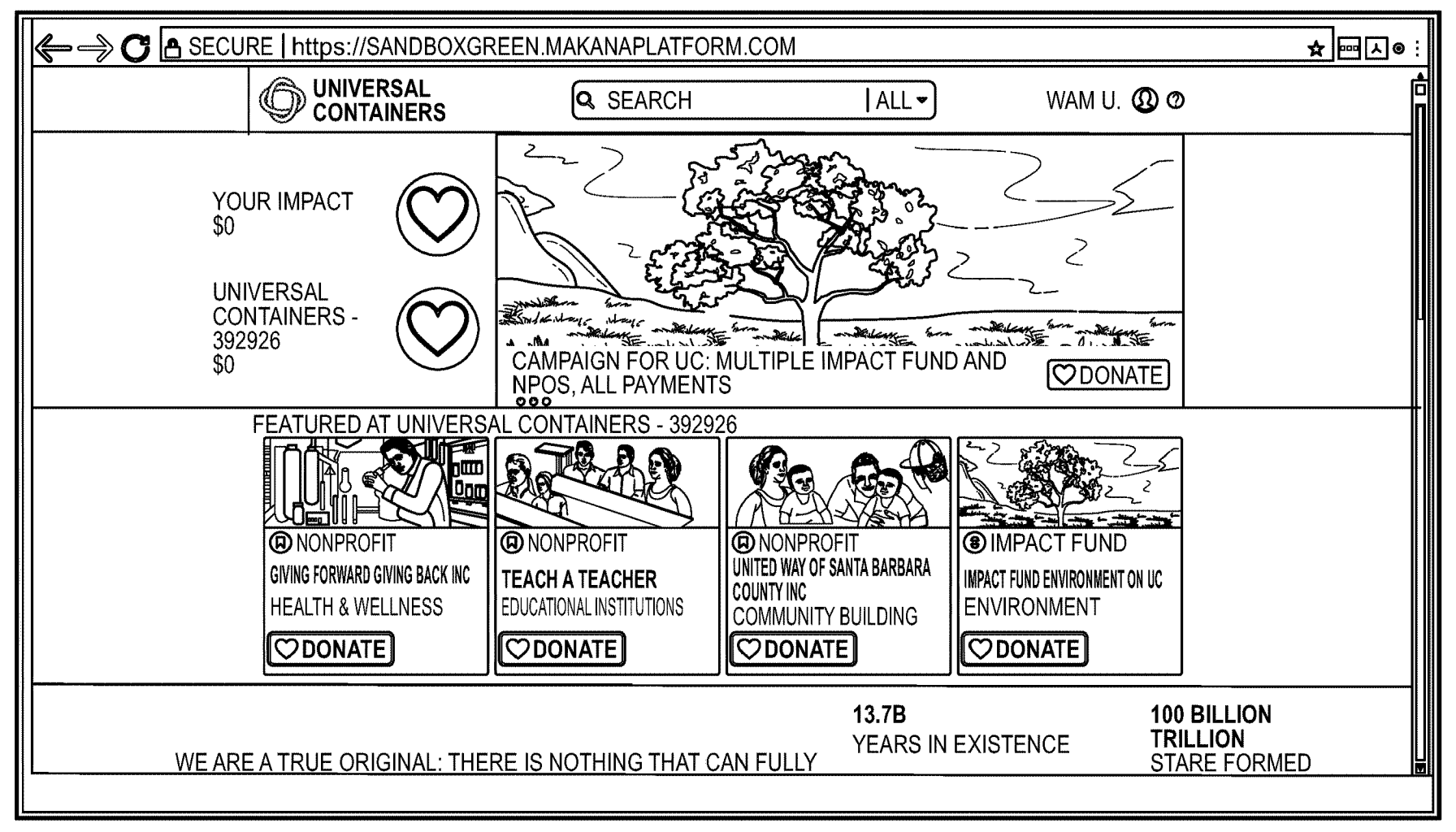

FIG. 7 is a diagram of one implementation of a corporate social responsibility portal. The users of an organization or workplace 115 can interact with a corporate social responsibility portal via a specialized client or general-purpose application such as a web browser. A content partner 135 may design content that is accessed by users (e.g., employees of a tenant) to provide information about the corporate social responsibility portal. The portal can provide an interface for reviewing organization sponsored charitable campaigns and similar information. A user can select any of the present campaigns to drill down into additional information about the plan and to make donations to associated non-profits.

The corporate social responsibility portal can also present user account information, a configuration, including user preferences, organization level information, management interfaces for users with roles with higher access/permissions and similar philanthropy cloud platform 101 access. A user can identify financial information, personal information, charitable interests, and similar interests in their account information. The corporate social responsibility portal can be specialized and tailored in terms of the presented information on a per user basis to make information of interest to the user easily accessible.

Figure 8A:
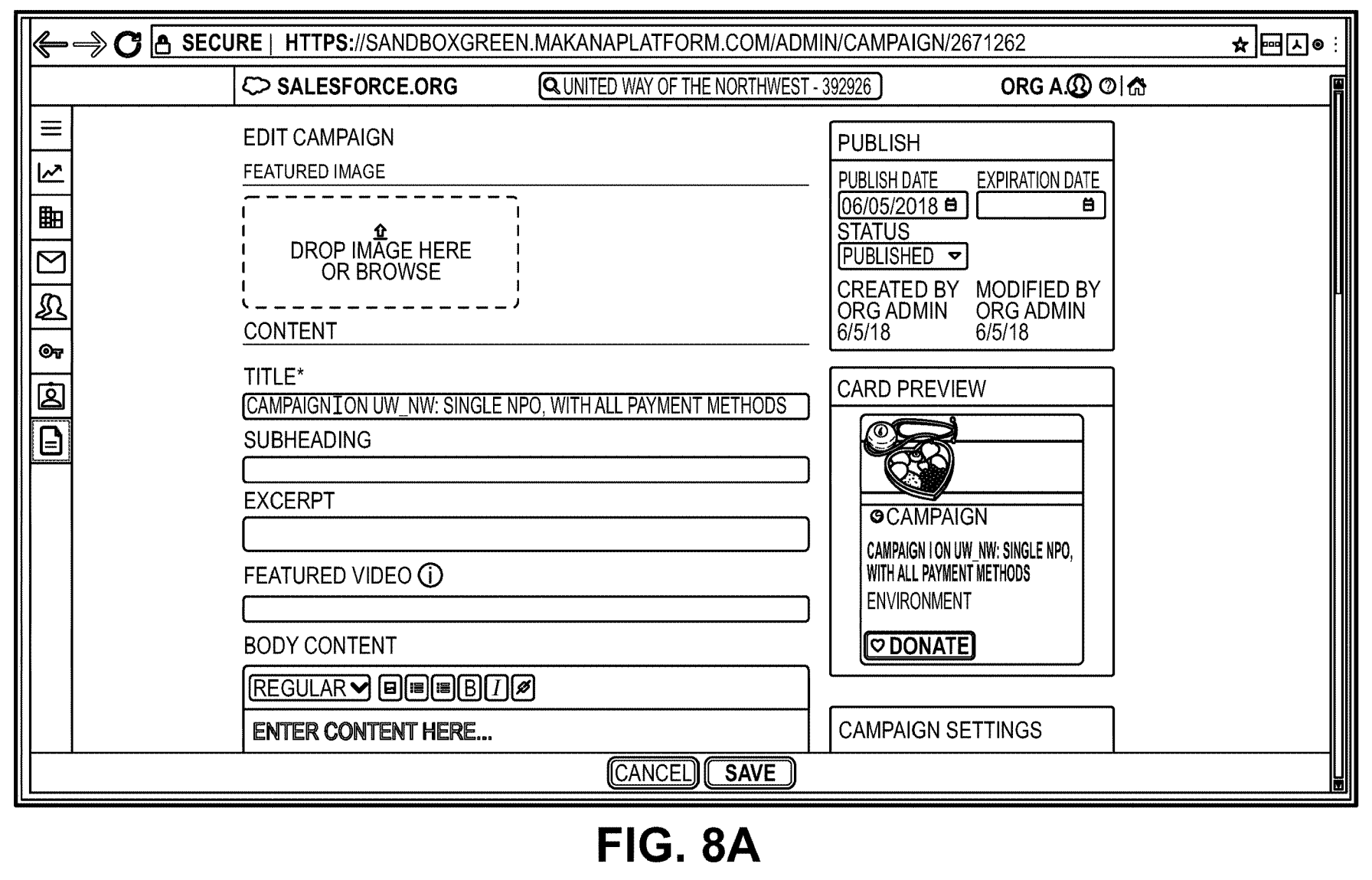
Figure 8B:
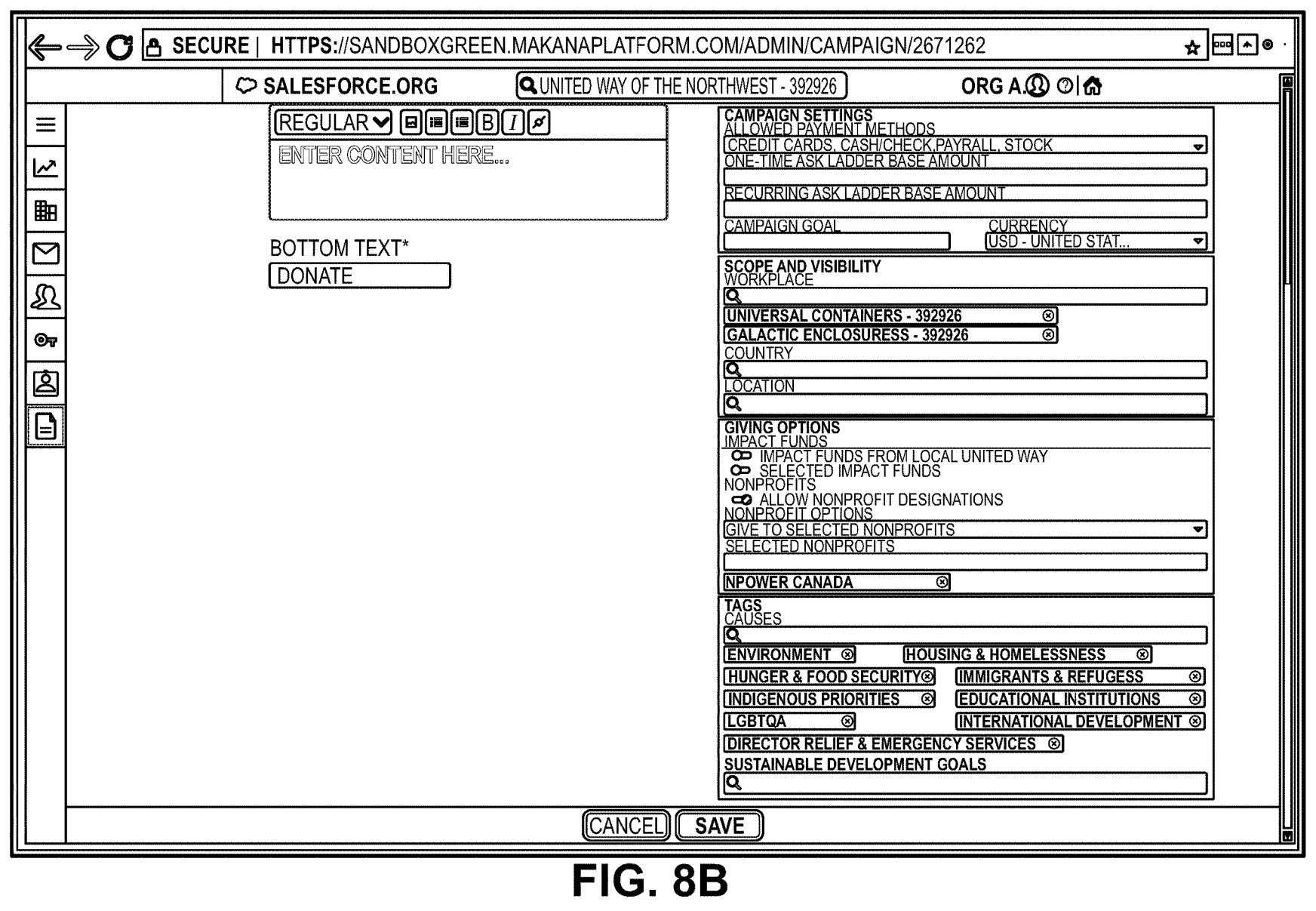

FIGS. 8A and 8B are diagrams of implementations of a content management interface enabling configuration of a scope of visibility and fund management. Users or entities with the supporting role of content partner can utilize tools provided by the philanthropy cloud platform to build corporate social responsibility program campaigns. The creation of such a campaign illustrates the flexibility of the philanthropy cloud platform 101. As shown in FIG. 8A, a user or entity in the role of the content partner 135 can create a campaign for a tenant organization by inputting descriptive information about the campaign such as a title, subheading, excerpt, images, videos, and broader description that are visible to users of an organization or workplace 115 to enable them to decide upon supporting such campaigns.

In addition, campaign management can be configured by inputting a date for making the campaign visible to users, i.e., a publication date, as well as a date for ending the campaign and removing the content from user accessibility. In addition, as shown in FIG. 8B, the campaign settings can further be configured to specify the types of payment methods accepted by transaction processors 129, timing of donations (e.g., one-time, or recurring donations), campaign goals (e.g., maximum accepted donations), and similar transaction related information. Other information that can be specified by a content partner can include associated tags or search terms that facilitate users being presented with charitable campaigns that align with their input interests or searches.

Campaign management also enables the content provider to specify scope and visibility of a campaign in the philanthropy cloud platform. Where a content partner serves in that role for multiple organizations and workplaces, then the content partner designing the campaign can specify which of the associated organizations and workplaces are able to take part or have visibility for the campaign. The content partner can also specify the set of non-profits and transaction processors that can benefit from and assist in transactions, respectively. In this way, the management of campaigns is decentralized to alleviate content creation, transaction processing and similar elements of campaign management such that they are not constrained to a platform provider or the organization itself.

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 9A:
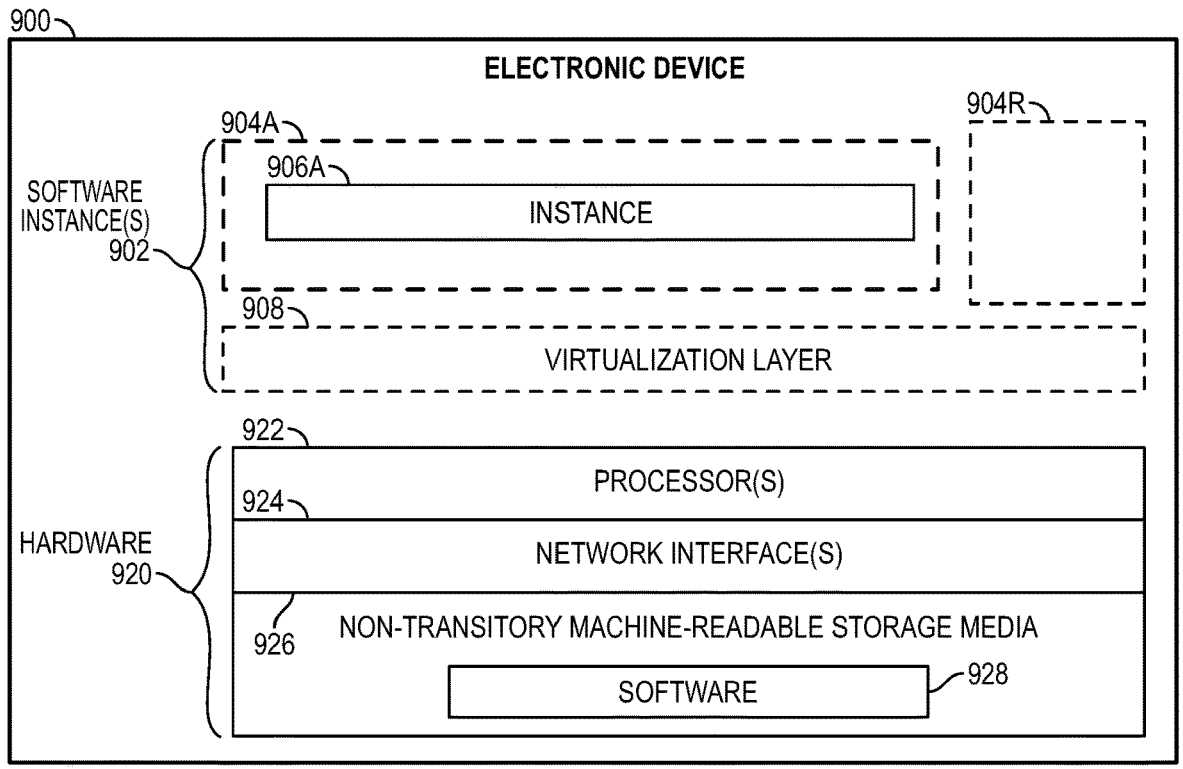
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and non-transitory machine-readable storage media 926 having stored therein software 928 (which includes instructions executable by the set of one or more processor(s) 922). Each of the previously described support organization and tenant organization user interactions with the philanthropy cloud platform and the services and resources of the philanthropy cloud platform itself may be implemented in one or more electronic devices 900. In one implementation: 1) each of the end user clients is implemented in a separate one of the electronic devices 900 (e.g., in user electronic devices operated by users of the tenant organization or organizations with supporting roles where the software 928 represents the software to implement end user clients to interface with the services and resources of the philanthropy cloud platform (e.g., a web browser, a native client, a portal, a command-line interface, and/or an application program interface (API) based upon protocols such as Simple Object Access Protocol (SOAP), Representational State Transfer (REST), etc.)); 2) the services and resources of the philanthropy cloud platform can be implemented in a separate set of one or more of the electronic devices 900 (e.g., a set of one or more server electronic devices where the software 928 represents the software to implement the service and resources of the philanthropy cloud platform); and 3) in operation, the electronic devices implementing the end user clients and the philanthropy cloud platform services and resources would be communicatively coupled (e.g., by a network) and would establish between them (or through one or more other layers) connections for submitting resource requests to the authorization points and returning a set of permissions to the authorization points and end user clients. Other configurations of electronic devices may be used in other implementations (e.g., an implementation in which the end user client and the philanthropy cloud platform services are implemented on a set of shared electronic devices 900).

In electronic devices that use compute virtualization, the set of one or more processor(s) 922 typically execute software to instantiate a virtualization layer 908 and software container(s) 904A-R (e.g., with operating system-level virtualization, the virtualization layer 908 represents the kernel of an operating system (or a shim executing on a base operating system) that allows for the creation of multiple software containers 904A-R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 928 (illustrated as instance 906A) is executed within the software container 904A on the virtualization layer 908. In electronic devices where compute virtualization is not used, the instance 906A on top of a host operating system is executed on the "bare metal" electronic device 900. The instantiation of the instance 906A, as well as the virtualization layer 908 and software containers 904A-R if implemented, are collectively referred to as software instance(s) 902.

Alternative implementations of an electronic device may have numerous variations from that described above. For example, customized hardware and/or accelerators might also be used in an electronic device.

Exemplary Environment

Figure 9B:
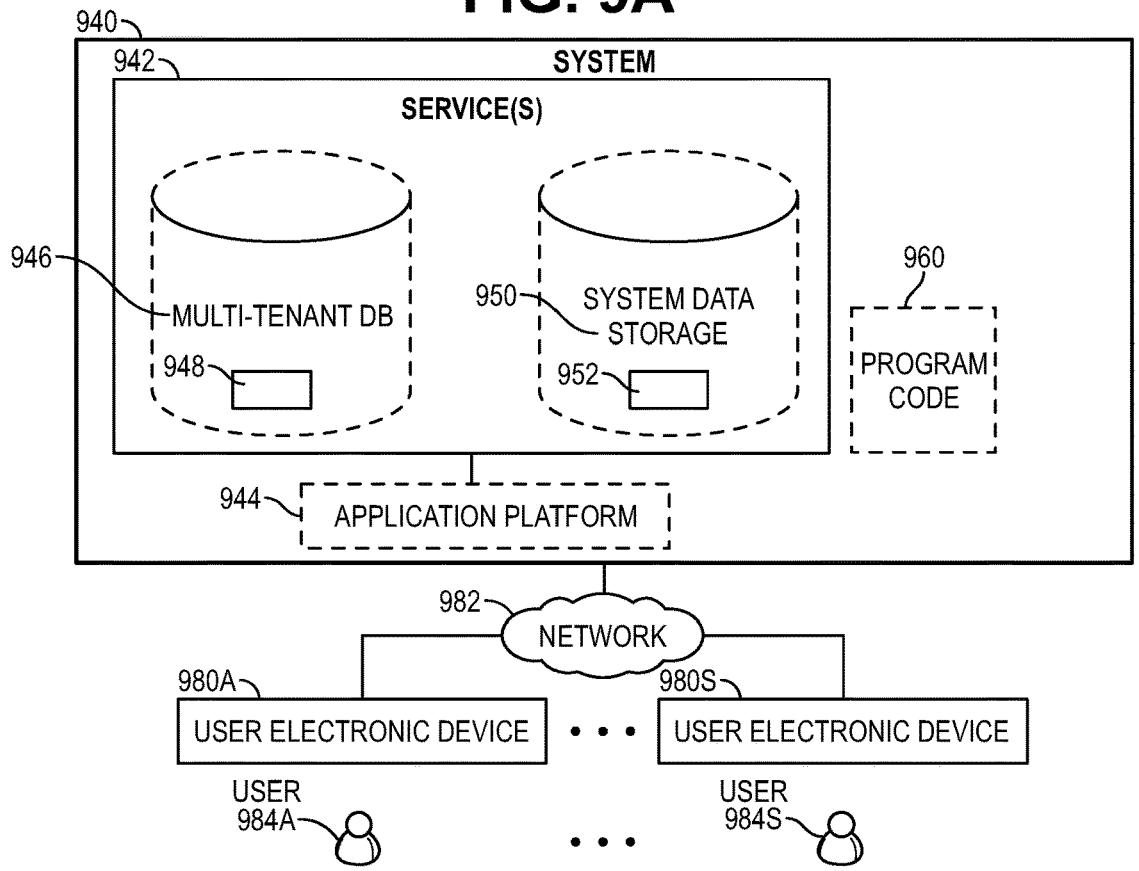
FIG. 9B is a block diagram of an environment where a corporate social responsibility platform may be deployed, according to some implementations.

FIG. 9B is a block diagram of an environment where an end user clients or services and resources of the philanthropy cloud platform may be deployed, according to some implementations. A system 940 includes hardware (a set of one or more electronic devices) and software to provide service(s) 942, including the XYZ service. The system 940 is coupled to user electronic devices 980A-S over a network 982. The service(s) 942 may be on-demand services that are made available to one or more of the users 984A-S working for one or more other organizations (sometimes referred to as outside users) so that those organizations do not need to necessarily be concerned with building and/or maintaining a system, but instead makes use of the service(s) 942 when needed (e.g., on the demand of the users 984A-S). The service(s) 942 may communication with each other and/or with one or more of the user electronic devices 980A-S via one or more Application Programming Interface(s) (APIs) (e.g., a Representational State Transfer (REST) API). The user electronic devices 980A-S are operated by users 984A-S.

In one implementation, the system 940 is a multi-tenant cloud computing architecture supporting multiple services, such as those of a philanthropy cloud platform. In other implementations, similar services can be applied to other services deployed in similar architectures such as customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 940 may include an application platform 944 that enables PAAS for creating, managing, and executing one or more applications developed by the provider of the application platform 944, users accessing the system 940 via one or more of user electronic devices 980A-S, or third-party application developers accessing the system 940 via one or more of user electronic devices 980A-S.

In some implementations, one or more of the service(s) 942 may utilize one or more multi-tenant databases 946 for tenant data 948, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user electronic device 980A-S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the one or more multi-tenant database 946 and/or system data storage 950.

In some implementations, the service(s) 942 are implemented using virtual applications dynamically created at run time responsive to queries from the user electronic devices 980A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 940 and the user electronic devices 980A-S.

Each user electronic device 980A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 940. For example, the user interface device can be used to access data and applications hosted by system 940, and to perform searches on stored data, and otherwise allow a user 984 to interact with various GUI pages that may be presented to a user 984. User electronic devices 980A-S might communicate with system 940 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 980A-S might include an HTTP client, commonly referred to as a "browser," for sending and receiving HTTP messages to and from server(s) of system 940, thus allowing users 984 of the user electronic device 980A-S to access, process and view information, pages and applications available to it from system 940 over network 982.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computer implemented method of managing access to resources of a cloud platform comprising:
   retrieving, at a computing device of the cloud platform, context data and load policies for a requestor and an identified resource from multiple tenants of the cloud platform;
   combining, by the computing device, loaded policies with context data into a combined data structure;
   evaluating, by the computing device, a resource request from the requestor and applying policies for the requestor based on a role of the requestor using the combined data structure, where the role is implemented external to the cloud platform, and where the combined data structure is parsed to identify logical expressions and related data for evaluating the logical expressions;
   generating, by the computing device, resource permissions for the requestor by evaluating the logical expressions; and
   returning, by the computing device, resource permissions to the requestor,
   wherein the cloud platform further includes a transaction manager to execute a method of charitable transaction processing, the method including,
   receiving a donation transaction request from a user in an organization, where the donation transaction request specifies non-profit recipients,
   selecting a transaction processor with a best match for organization preferences from a plurality of available transaction processors, and
   sending the donation transaction request to the selected transaction processor to route funds to specified non-profits.

2. The method of claim 1, further comprising:
   receiving the resource request from the requestor, the resource request including the identifier for the resource and requestor information.

3. The method of claim 1, further comprising:
   checking a context cache for the context data for the requestor and the identified resource;
   determining that the context data is present in the context cache; and
   loading the context data in response to the determining.

4. The method of claim 1, wherein the cloud platform enables external assignment of supporting roles, the method further comprising:
   evaluating the resource request includes determining whether the requestor has access to the requested resource based on the role assigned to the requestor in the cloud platform.

5. The method of claim 4, wherein the role assigned to the requestor can be specific to any one or more of a tenant organization of the cloud platform, or a workplace of a tenant organization.

6. The method of claim 1, wherein resource permissions are provided to an application programming interface (API) of the cloud platform to be enforced for functions of the API.

7. A non-transitory machine-readable storage medium that provides instructions that, if executed by a processor, will cause said processor to perform operations manage access to resources of a cloud platform, the operations comprising:
   retrieving context data and load policies for a requestor and an identified resource from multiple tenants of the cloud platform;
   combining loaded policies with context data into a combined data structure;
   evaluating a resource request from the requestor and applying policies for the requestor based on a role of the requestor using the combined data structure, where the role is implemented external to the cloud platform, and where the combined data structure is parsed to identify logical expressions and related data for evaluating the logical expressions;
   generating resource permissions for the requestor by evaluating the logical expressions; and
   returning resource permissions to the requestor,
   wherein the cloud platform further includes a transaction manager to execute a method of charitable transaction processing, the operations further including,
   receiving a donation transaction request from a user in an organization, where the donation transaction request specifies non-profit recipients,
   selecting a transaction processor with a best match for organization preferences from a plurality of available transaction processors, and
   sending the donation transaction request to the selected transaction processor to route funds to specified non-profits.

8. The non-transitory machine-readable medium of claim 7, the operations further comprising:
   receiving the resource request from the requestor, the resource request including the identifier for the resource and requestor information.

9. The non-transitory machine-readable medium of claim 7, the operations further comprising:
   checking a context cache for the context data for the requestor and the identified resource;
   determining that the context data is present in the context cache; and
   loading the context data in response to the determining.

10. The non-transitory machine-readable medium of claim 7, wherein the cloud platform enables external assignment of supporting roles, the operations further comprising:
   evaluating the resource request includes determining whether the requestor has access to the requested resource based on the role assigned to the requestor in the cloud platform.

11. The non-transitory machine-readable medium of claim 10, wherein the role assigned to the requestor can be specific to any one or more of a tenant organization of the cloud platform, or a workplace of a tenant organization.

12. The non-transitory machine-readable medium of claim 7, wherein resource permissions are provided to an application programming interface (API) of the cloud platform to be enforced for functions of the API.

13. A computing device in a cloud platform, the computing device implementing a method of managing access to resources of a cloud platform comprising:
a non-transitory machine-readable medium having stored therein a permissions manager; and
one or more processors coupled to the non-transitory machine-readable medium, the one or more processors to execute the permissions manager, the permissions manager to retrieve context data and load policies for a requestor and an identified resource from multiple tenants of the cloud platform, to combine loaded policies with context data into a combined data structure, to evaluate a resource request and apply policies for the requestor based on a role of the requestor using the combined data structure, where the role is implemented external to the cloud platform, and where the combined data structure is parsed to identify logical expressions and related data for evaluating the logical expressions, to generate resource permissions for the requestor by evaluating the logical expressions, and to return resource permissions to the requestor, wherein the cloud platform further includes a transaction manager to execute a method of charitable transaction processing, the transaction manager to receive a donation transaction request from a user in an organization, where the donation transaction request specifies non-profit recipients, to select a transaction processor with a best match for organization preferences from a plurality of available transaction processors, and to send the donation transaction request to the selected transaction processor to route funds to specified non-profits.

14. The computing device of claim 13, wherein the permissions manager is further to
receive the resource request from the requestor, the resource request including the identifier for the resource and requestor information.

15. The computing device of claim 13, wherein the permission manager is further to check a context cache for the context data for the requestor and the identified resource, to determine that the context data is present in the context cache, and to load the context data in response to the determining.

16. The computing device of claim 13, wherein the cloud platform enables external assignment of supporting roles, the permission manager to evaluate the resource request includes determining whether the requestor has access to the requested resource based on the role assigned to the requestor in the cloud platform.

17. The computing device of claim 16, wherein the role assigned to the requestor can be specific to any one or more of a tenant organization of the cloud platform, or a workplace of a tenant organization.

18. The computing device of claim 13, wherein resource permissions are provided to an application programming interface (API) of the cloud platform to be enforced for functions of the API.

* * * * *